No. 701,373. Patented June 3, 1902.
J. W. McLEAN.
WATER FILTER.
(Application filed Mar. 1, 1902.)
(No Model.)
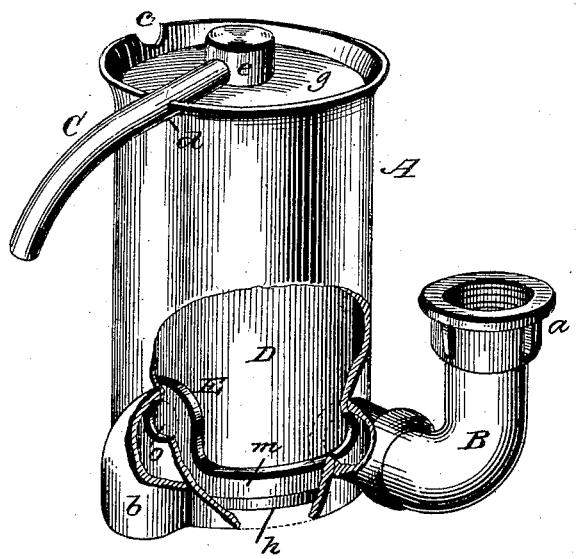
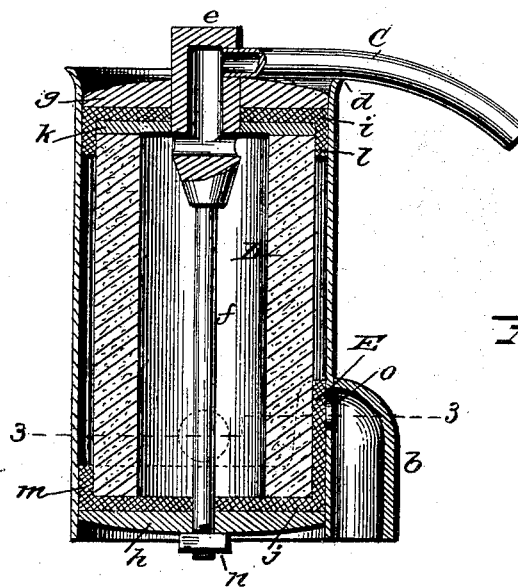
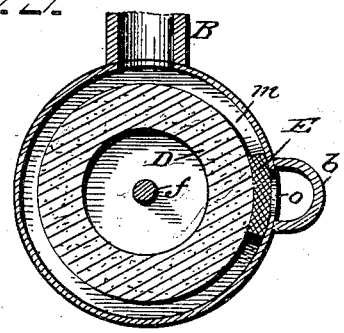
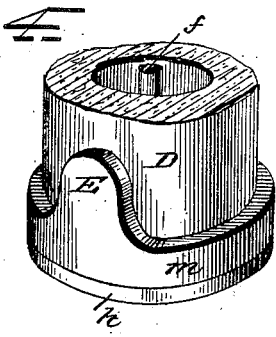
Inventor
James W. McLean
per Chas. M. Fowler
Attorney
Witnesses:
C. Williamson
M. E. Moore

UNITED STATES PATENT OFFICE.

JAMES W. McLEAN, OF JOPLIN, MISSOURI.

WATER-FILTER.

SPECIFICATION forming part of Letters Patent No. 701,373, dated June 3, 1902.

Application filed March 1, 1902. Serial No. 96,252. (No model.)

*To all whom it may concern:*

Be it known that I, JAMES W. MCLEAN, a citizen of the United States, residing at Joplin, in the county of Jasper and State of Missouri, have invented certain new and useful Improvements in Water-Filters; and I do hereby declare that the following is a full, clear, and exact description of the same, reference being had to the annexed drawings, making a part of this specification, and to the letters of reference marked thereon.

The present invention has for its object to provide a water-filter that may be readily attached to a water-service bibb or faucet and from which filtered or unfiltered water may be drawn, as found desirable; and it consists in a filter constructed substantially as shown in the drawings and hereinafter described and claimed.

Figure 1 of the drawings is a perspective view of a water-filter constructed in accordance with my invention and showing a portion of the outer cylinder partly broken away; Fig. 2, a vertical section thereof; Fig. 3, a horizontal section taken on line 3 3 of Fig. 2; Fig. 4, a detail perspective view of the lower end of the filtering cylinder or block with the valve or cut-off connected thereto.

In the accompanying drawings, A represents the outer cylinder of the filter, which may be of any suitable metal and open at its top and provided with a coupling-pipe B and screw coupling-ring $a$ for coupling the pipe to a water-service bibb or faucet, the coupling pipe and ring being of any suitable construction, or any desirable and well-known means may be employed for forming a connection between the cylinder and water-service bibb or faucet. The cylinder A is open at both top and bottom and is provided at its lower end with a discharge $b$ for unfiltered water, and upon its upper edge are notched seats $c$ $d$ to receive a nozzle C for the discharge of filtered water. The nozzle C is connected to a hollow head $e$, from which extends a coupling-rod $f$ for securing the heads $g$ $h$ to the ends of the filtering body or cylinder D, which may be of any suitable and well-known porous filtering material or compound. Suitable packing $i$ $j$ are interposed between the heads $g$ $h$, respectively, and the ends of the filtering-cylinder D, a second packing $k$ being placed under the packing $i$. These packings $i$ $j$ have inwardly-extending flanges $l$ $m$, respectively, or, in other words, the packings are cup-shaped, the flanges or rims extending between the outer cylinder A and filtering cylinder or body D, so that a space for the water will be left between the outer cylinder and filtering-cylinder. The rod $f$ draws the heads $g$ $h$ tightly against the ends of the filtering body or cylinder by means of the nut $n$ engaging the screw-threads of the rod.

Any suitable filtering cylinder or body may be substituted for that shown, and any suitable means may be employed for holding the heads to the ends of the filtering-cylinder, and any preferred means of packing may be used, as found best adapted to the purpose.

I provide what I term a "valve" or "cut-off" for closing the opening in the discharge $b$ when it is desired to cause the water to be filtered by passing through the filtering body or cylinder D and out through the nozzle C. The valve or cut-off is connected directly with the filtering body or cylinder D and rotates therewith and preferably consists in extending the flange or rim $m$ of the packing $j$ on a line with and slightly above the opening $o$ in the discharge $b$. This will provide the necessary valve or cut-off, as shown at E, which will close the opening $o$ in the discharge $b$ and force the water through the filtering body or cylinder D and out through the hollow head $e$ and through the discharge-nozzle C. When the water is required to pass through a filtering medium, it will necessarily be discharged through the nozzle in much smaller quantities than when the water passes directly from the service-pipe to the discharge. In many instances filtered water is not required, and in such cases the water may be allowed to pass directly from the service-pipe to the discharge without passing through the filtering medium. When it is desired to have unfiltered water and allow the water to discharge much quicker and in larger quantities, the filtering body or cylinder, with its attachments, is rotated or turned upon its axis until the discharge-nozzle C will rest in the notched seat $c$, when the valve or cut-off E will be removed from opposite the opening $o$ of the discharge $b$, which will open the same and allow the water to pass unfiltered through the discharge. The discharge-nozzle C acts as a handle to turn the cylinder D, and the cylinder is held in its adjusted position, when moved to close the discharge-opening o, by means of the nozzle engaging with the notched seat d, and when the discharge b is open for the discharge of unfiltered water the nozzle engages with the notched seat c.

It should be understood that the filtered and unfiltered water is obtained solely by the rotation or turning bodily of the filtering body or cylinder, which carries the valve or cut-off to close or open the discharge, and in this respect is materially different than filters of this class heretofore in use. The rotation of the filtering body or cylinder to control the discharge by closing or opening the same dispenses with the usual drain or other discharge valve connected to the bottom of the outer cylinder and which operates independent of the filtering body or cylinder. In having the discharge extending through the side of the outer cylinder and the opening therein controlled by the rotation of the filtering body or cylinder the filter is rendered more simple in construction and more effective in operation.

Having now fully described my invention, what I claim as new, and desire to secure by Letters Patent, is—

1. A water-filter comprising an outer cylinder provided with means for attaching it to a service pipe or bibb and having a discharge for unfiltered water extending through its side, and a rotatable filtering body or cylinder carrying a suitable valve or cut-off whereby the opening in the discharge is opened or closed by the rotation or turning of said filtering body or cylinder, substantially as and for the purpose set forth.

2. A water-filter, comprising an outer cylinder provided with means for connecting it with the service pipe or bibb, and having at its upper and lower ends respectively suitable notched seats and a discharge for unfiltered water, and a rotatable filtering body or cylinder having discharge-nozzle for the filtered water adapted to engage the notched seats, and a valve or cut-off carried by said filtering body or cylinder to open or close the unfiltered-water discharge, substantially as and for the purpose specified.

In testimony that I claim the above I have hereunto subscribed my name in the presence of two witnesses.

JAMES W. McLEAN.

Witnesses:
JAMES FOLEY,
H. E. BOYD.